(12) United States Patent
Han et al.

(10) Patent No.: US 10,234,184 B2
(45) Date of Patent: Mar. 19, 2019

(54) METHOD AND APPARATUS FOR MONITORING STATUS OF TERMINAL COMPRESSOR

(71) Applicant: Xiaomi Inc., Beijing (CN)

(72) Inventors: Guangyi Han, Beijing (CN); Yue Liang, Beijing (CN); Enxing Hou, Beijing (CN)

(73) Assignee: Xiaomi Inc., Beijing (CN)

( * ) Notice: Subject to any disclaimer, the term of this patent is extended or adjusted under 35 U.S.C. 154(b) by 349 days.

(21) Appl. No.: 15/097,465

(22) Filed: Apr. 13, 2016

(65) Prior Publication Data
US 2016/0377334 A1    Dec. 29, 2016

(30) Foreign Application Priority Data

Jun. 25, 2015  (CN) .......................... 2015 1 0359748

(51) Int. Cl.
*F25B 49/02* (2006.01)
*H04L 12/28* (2006.01)
*G01M 99/00* (2011.01)

(52) U.S. Cl.
CPC ......... *F25B 49/022* (2013.01); *G01M 99/008* (2013.01); *H04L 12/283* (2013.01); *H04L 12/2825* (2013.01); *H04L 2012/285* (2013.01)

(58) Field of Classification Search
CPC .................................................... F25B 49/022
USPC ....................................................... 702/185
See application file for complete search history.

(56) References Cited

U.S. PATENT DOCUMENTS

| 7,403,850 | B1* | 7/2008 | Boutin ................. G01M 15/05 701/107 |
| 9,441,991 | B2 | 9/2016 | Haga et al. |
| 2007/0089440 | A1 | 4/2007 | Singh et al. |
| 2011/0060553 | A1 | 3/2011 | Han et al. |
| 2011/0208880 | A1 | 8/2011 | Zhang |
| 2015/0150088 | A1 | 5/2015 | Haga et al. |

FOREIGN PATENT DOCUMENTS

| CN | 202721877 U | 2/2013 |
| CN | 103217955 A | 7/2013 |
| CN | 103905588 A | 7/2014 |
| CN | 104122876 A | 10/2014 |

(Continued)

OTHER PUBLICATIONS

International Search Report and Written Opinion for PCT/CN2015/090601, mailed from the State Intellectual Property Office of China dated Apr. 8, 2016.

(Continued)

*Primary Examiner* — Marc Anthony Armand
(74) *Attorney, Agent, or Firm* — Finnegan, Henderson, Farabow, Garrett & Dunner LLP

(57) ABSTRACT

The present disclosure provides a method and an apparatus for monitoring a status of a terminal compressor. The method includes: obtaining a working status parameter of a compressor in a first terminal; judging whether the working status parameter falls in a preset range; if the working status parameter does not fall in the preset range, determining that an abnormality of the compressor occurs; and analyzing a reason for the abnormality and transmitting preset information to a second terminal that controls the first terminal.

17 Claims, 17 Drawing Sheets

(56) References Cited

FOREIGN PATENT DOCUMENTS

| CN | 104698321 A | 6/2015 |
|---|---|---|
| JP | H10-124985 A | 5/1998 |
| JP | H10-187236 A | 7/1998 |
| JP | H11-94336 A | 4/1999 |
| JP | 2002-366683 A | 12/2002 |
| JP | 2005-241089 A | 9/2005 |
| JP | 2010-169287 A | 8/2010 |
| JP | 2015-082154 A | 4/2015 |
| WO | WO 2014/171119 A1 | 10/2014 |

OTHER PUBLICATIONS

Extended European Search Report of European Patent Application No. 16159119.3, from the European Patent Office, dated Oct. 12, 2016.

Wilfried Reimche et al., "Basics of Vibration Monitoring for Fault Detection and Process Control", dated Jun. 2, 2003, XP-002454577, Internet Citation, URL: http://www.aaende.org.ar/ingles/sitio/biblioteca/material/T-039.pdf (retrieved on Oct. 11, 2007).

Office Action for Korean Application No. 10-2016-7006855, mailed from the Korean Intellectual Office dated May 18, 2017.

Office Action issued in Chinese Patent Application 201510359748.5, mailed from State Intellectual Property Office of China, dated Nov. 16, 2017.

Zhang W. et al., "WinCC wind tunnel axial flow compressor monitoring interface design and Implementation Based on", Automation & Instrumentation, published on Jun. 2, 2015.

Office Action for Japanese Application No. 2016-518772, from the Japanese Patent Office, dated Aug. 29, 2017.

* cited by examiner

104

Judging Whether Working Current Exceeds Preset Normal Working Current Range of Compressor ~202

| When First Terminal Is in Preset Operation Mode, Judging Whether Working Current Exceeds Preset Working Current Range of Preset Operation Mode ~ 302 |

| Obtaining Historical Operation Information of Compressor, and Determining Reason for Abnormality of Compressor According to Historical Operation Information | ~ 402 |

| Judging Whether Vibrational Displacement Exceeds Preset Displacement Threshold and Lasts for Time Longer Than Preset Time Threshold | ~ 602 |

| Matching Vibrational Displacement Curve Corresponding to Vibrational Displacement with Pre-Stored Vibrational Displacement Curve to Obtain Second Matching Result, and Determining, According to Second Matching Result, Whether Compressor Has Fault and Reason for Fault | ~702 |

| Transmitting Prompt Information Regarding Occurrence of Abnormality to Second Terminal, and, When Reason for Abnormality Is Analyzed, Transmitting Prompt Information Regarding Reason for Abnormality to Second Terminal | ~ 802 |

FIG. 8

Analyzing and Transmitting Module 940

Second Determining Sub-Module 944

FIG. 15

METHOD AND APPARATUS FOR MONITORING STATUS OF TERMINAL COMPRESSOR

CROSS-REFERENCE TO RELATED APPLICATIONS

This application is based upon and claims priority to Chinese Patent Application No. 201510359748.5, filed Jun. 25, 2015, the entire contents of which are incorporated herein by reference.

TECHNICAL FIELD

The present disclosure generally relates to the field of intelligent home technology and, more particularly, to a method and an apparatus for monitoring a status of a terminal compressor.

BACKGROUND

Intelligent home is a connection of things based on the Internet. With the IoT (Internet of Things) technology, the intelligent home connects various devices in a house, such as an air conditioner, audiovisual equipment, a lighting system, a curtain controller, a security system, a digital theater system, a video server, a video archival system, and network appliances. Therefore, the intelligent home may provide various functions and means, such as household appliance control, lighting control, telephone remote control, indoor and outdoor remote control, burglar alarm, environment monitoring, heating and ventilation control, infrared transponding, and programmable timing control. The intelligent home not only provides a traditional residential function, but also integrates advantages of architecture, network communication, information appliances, and equipment automation, so as to provide a comprehensive information interaction.

A compressor is a key component of a device such as an air conditioner used in the intelligent home. The working status of the compressor may directly affect the useful life and the working quality of the device that uses the compressor.

SUMMARY

According to a first aspect of the present disclosure, there is provided a method for monitoring a status of a terminal compressor, comprising: obtaining a working status parameter of a compressor in a first terminal; judging whether the working status parameter falls in a preset range; if the working status parameter does not fall in the preset range, determining that an abnormality of the compressor occurs; and analyzing a reason for the abnormality and transmitting preset information to a second terminal that controls the first terminal.

According to a second aspect of the present disclosure, there is provided an apparatus for monitoring a status of a terminal compressor, comprising: a processor; and a memory configured to store instructions executable by the processor; wherein the processor is configured to: obtain a working status parameter of a compressor in a first terminal; judge whether the working status parameter falls in a preset range; if the working status parameter does not fall in the preset range, determine that an abnormality of the compressor occurs; and analyze a reason for the abnormality and transmit preset information to a second terminal that controls the first terminal.

According to a third aspect of the present disclosure, there is provided a non-transitory computer-readable storage medium storing instructions that, when executed by a processor of a device, causes the device to perform a method for monitoring a status of a terminal compressor, the method comprising: obtaining a working status parameter of a compressor in a first terminal; judging whether the working status parameter falls in a preset range; if the working status parameter does not fall in the preset range, determining that an abnormality of the compressor occurs; and analyzing a reason for the abnormality and transmitting preset information to a second terminal that controls the first terminal.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

FIG. 2 illustrates a step in a method for monitoring a status of a terminal compressor, according to an exemplary embodiment.

FIG. 3 illustrates a step in a method for monitoring a status of a terminal compressor, according to an exemplary embodiment.

FIG. 4 illustrates a step in a method for monitoring a status of a terminal compressor, according to an exemplary embodiment.

FIG. 6 illustrates a step in a method for monitoring a status of a terminal compressor, according to an exemplary embodiment.

FIG. 7 illustrates a step in a method for monitoring a status of a terminal compressor, according to an exemplary embodiment.

FIG. 8 illustrates a step in a method for monitoring a status of a terminal compressor, according to an exemplary embodiment.

FIG. 15 is a block diagram of an information analyzing and transmitting module in an apparatus for monitoring a status of a terminal compressor, according to an exemplary embodiment.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the present disclosure as recited in the appended claims.

Figure 1:
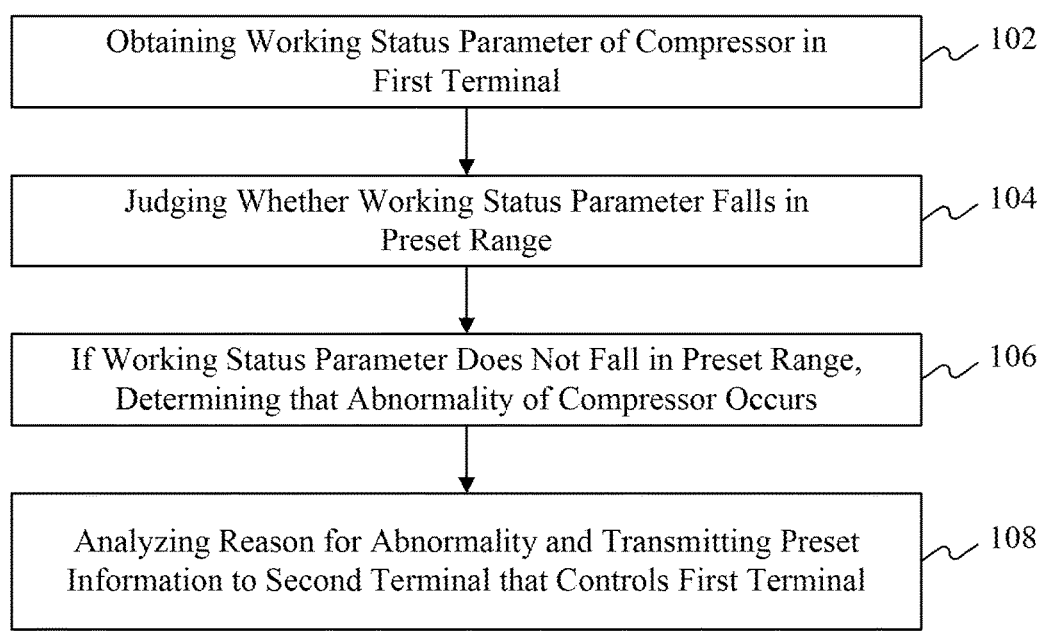
FIG. 1 is a flowchart of a method for monitoring a status of a terminal compressor, according to an exemplary embodiment.

FIG. 1 is a flowchart of a method 100 for monitoring a status of a terminal compressor, according to an exemplary embodiment. For example, the method 100 may be used in a server. Alternatively, the method 100 may be used in a first terminal that includes the compressor, such as an air conditioner, a refrigerator, or any other equipment with a compressor. Referring to FIG. 1, the method 100 includes the following steps 102-108. Each of steps 102-108 may be performed by the first terminal or the server.

In step 102, a working status parameter of the compressor is obtained.

In one exemplary embodiment, the method 100 is used in the first terminal. The first terminal obtains a working status parameter of the compressor and then processes the parameter. The first terminal may be any equipment using the compressor, such as an air conditioner, a refrigerator, and any other refrigeration equipment. The first terminal has a function of collecting the working status parameter. For example, a sensor or detecting device may be disposed in the first terminal, so as to collect the working status parameter.

In another exemplary embodiment, the method 100 is used in a server. The first terminal may upload the working status parameter of the compressor to the server, and the server receives the uploaded working status parameter. The first terminal may include a sensor to collect the working status parameter. However, the first terminal may not process the working status parameter, but instead uploads the working status parameter to the server for processing.

In some exemplary embodiments, the working status parameter may include at least one of a working current of the compressor or a vibrational displacement of the compressor. During implementation, the first terminal may include a current detecting device capable of detecting the working current of the compressor. The first terminal may further include a vibration sensor capable of detecting the vibrational displacement of the compressor. For example, the first terminal may connect to a router via a Wi-Fi module of the first terminal, to transmit to the server one or more parameters about the working current and/or vibrational displacement of the compressor. The user may control the working status of the first terminal through a second terminal (e.g., through a mobile terminal application on the second terminal) that has a control relationship with the first terminal.

In one exemplary embodiment, the server may receive the working status parameter of the compressor via a pre-established communication connection between the server and the first terminal, such as a near field communication connection, a wireless local area network (LAN) connection, or a wireless network connection via a public mobile communication network. In this manner, the server may obtain the working status parameter locally or remotely.

In step 104, it is judged whether the working status parameter falls in a preset range.

The preset range may be a normal working current range of the compressor or a normal vibrational displacement range of the compressor. Since different first terminals may have different power settings, the working current and vibrational displacement of the corresponding first terminals may also be different. Thus, different preset ranges may be set for different compressors. Moreover, it is conceivable that the preset range may be one or more preset values.

In step 106, if the working status parameter does not fall in the preset range, it is determined that an abnormality of the compressor occurs.

The abnormality of the compressor may be caused by failure of the compressor, aging of the compressor, failure of executing user instructions, or other reasons, which need to be further analyzed and determined.

In step 108, a reason for the abnormality is analyzed and preset information is transmitted to a second terminal that controls the first terminal.

The second terminal may be a mobile terminal, or a terminal at a fixed position. The preset information pertains to the reason for the abnormality. After receiving the preset information, the second terminal may quickly determine which kind of abnormality occurs.

A communication connection may be pre-established between the second terminal and the server or the first terminal, so as to facilitate the transmission of the preset information. The communication connection may be established based on the control rights of the second terminal to the first terminal. That is, only after the control rights of the second terminal is verified, the connection may be established, so as to ensure the security and reliability of transmitting the preset information.

The communication connection between the second terminal and the server or the first terminal may be realized in various manners, such as a near field communication connection, a wireless LAN connection, or a wireless network connection via a public mobile communication network.

In some exemplary embodiments, the working status parameter may include a working current of the compressor. Correspondingly, step 104 may be implemented as the following step 202 or step 302.

FIG. 2 illustrates step 202 in a method for monitoring a status of a terminal compressor, according to an exemplary embodiment. Referring to FIG. 2, in step 202, it is judged whether the working current of the compressor exceeds a preset normal working current range.

FIG. 3 illustrates step 302 in a method for monitoring a status of a terminal compressor, according to another exemplary embodiment. Referring to FIG. 3, in step 302, when the first terminal is in a preset operation mode, it is judged whether the working current exceeds a preset working current range of the preset operation mode.

In exemplary embodiments, the first terminal may have various operation modes according to the different requirements of the user. For example, an air conditioner may have multiple operation modes, such as cooling, heating, dehumidification, air supply, and power saving. Each mode may have a different working current range. For instance, if the user switches the air conditioner into the power saving mode but the actual working current of the compressor has a large value exceeding the normal working current range of the power saving mode, it can be determined that an abnormality of the compressor occurs. Compared to step 202, step 302 judges whether the working current exceeds the preset working current range of a particular operation mode, and therefore may make a more accurate judgment of the working current.

FIG. 4 illustrates step 108 in the method 100 (FIG. 1) for monitoring a status of a terminal compressor, according to an exemplary embodiment. Referring to FIG. 4, step 108 may further include step 402. In step 402, historical operation information of the compressor is obtained, such that a reason for the abnormality of the compressor may be determined according to the historical operation information.

In some exemplary embodiments, the historical operation information may include a time for which the compressor has been used and a fault log of the compressor. When the compressor has an abnormality, it is possible to determine the reason for the abnormality quickly and accurately according to the historical operation information of the compressor.

Figure 5:
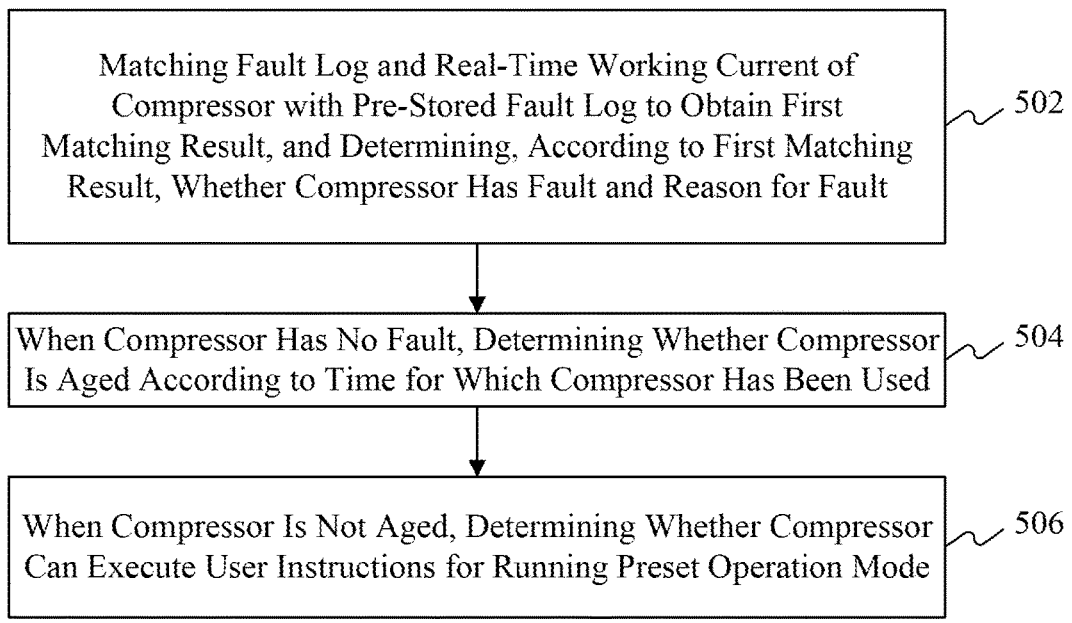
FIG. 5 is a flowchart of a step in a method for monitoring a status of a terminal compressor, according to an exemplary embodiment.

FIG. 5 is a flowchart of step 402 in the method for monitoring a status of a terminal compressor, according to an exemplary embodiment. Referring to FIG. 5, step 402 may further include the following steps 502-506.

In step 502, a fault log and a real-time working current of the compressor are matched with a pre-stored fault log to obtain a first matching result and, according to the first matching result, whether the compressor has a fault is judged and the reason for the fault is determined.

When the compressor has no fault, it may be further judged whether the compressor is aged according to the historical operation information, the real-time working current, and the current operation mode of the compressor. When the user controls the first terminal through the second terminal, for example, through an application on the second terminal, it may also be judged whether the first terminal can execute instructions given by the application.

In step 504, when the compressor has no fault, it is judged whether the compressor is aged according to the time for which the compressor has been used.

Since aging may be a reason leading to the abnormality of the compressor, the aging of the compressor may be examined when no fault occurs.

In step 506, when the compressor is not aged, it is judged whether the compressor can execute user instructions for running a preset operation mode.

If the compressor neither has fault nor is aged, it is possible that the abnormality is due to that the compressor does not execute user instructions for running a preset operation mode. By examining the potential reasons for the abnormality one by one, the actual reason may be finally determined.

In the present embodiment, the fault log may be pre-stored in the server or the first terminal, such that it is possible to match the real-time working current with the pre-stored fault log when the abnormality of the compressor occurs. Therefore, the present embodiment provides a simplified, quick, and accurate solution to determine whether the compressor has a fault and the reason for the fault.

In some exemplary embodiments, the working status parameter may include a vibrational displacement of the compressor.

FIG. 6 illustrates step 104 in the method 100 (FIG. 1) for monitoring a status of a terminal compressor, according to an exemplary embodiment. Referring to FIG. 6, step 104 may be executed as step 602. In step 602, it is judged whether the vibrational displacement exceeds a preset displacement threshold and lasts for a time longer than a preset time threshold.

FIG. 7 illustrates step 108 in the method 100 (FIG. 1) for monitoring a status of a terminal compressor, according to an exemplary embodiment. Referring to FIG. 7, step 108 may further include step 702. In step 702, a vibrational displacement curve corresponding to the vibrational displacement is matched with a pre-stored vibrational displacement curve, to obtain a second matching result. Moreover, according to the second matching result, whether the compressor has a fault and a reason for the fault may be further determined.

In the present embodiment, vibrational displacement curves corresponding to various faults may be pre-stored in the server or the first terminal. When the current vibrational displacement of the compressor exceeds a preset displacement threshold and lasts for a time longer than a preset time threshold, the current vibrational displacement curve may be compared with the pre-stored vibration displacement curves to quickly determine whether the compressor has a fault and the reason corresponding to the fault.

FIG. 8 is a flowchart of step 108 in the method 100 (FIG. 1) for monitoring a status of a terminal compressor, according to an exemplary embodiment. Referring to FIG. 8, step 108 may further include step 802. In step 802, prompt information regarding the occurrence of the abnormality is transmitted to the second terminal. Moreover, when the reason for the abnormality is analyzed, prompt information regarding the reason for the abnormality is transmitted to the second terminal. Consequently, the user may be timely and directly informed of the abnormality of the compressor.

According to the above-described method 100, the server or the first terminal may transmit the preset information to the second terminal when it is determined that an abnormality of the compressor occurs, such that the user can be timely informed of the occurrence of the abnormality and the reason for the abnormality through the second terminal. The user can then take further actions towards the abnormality of the compressor. Therefore, the method 100 realizes the intellectualization of the first terminal and improves the user experience.

Figure 9:
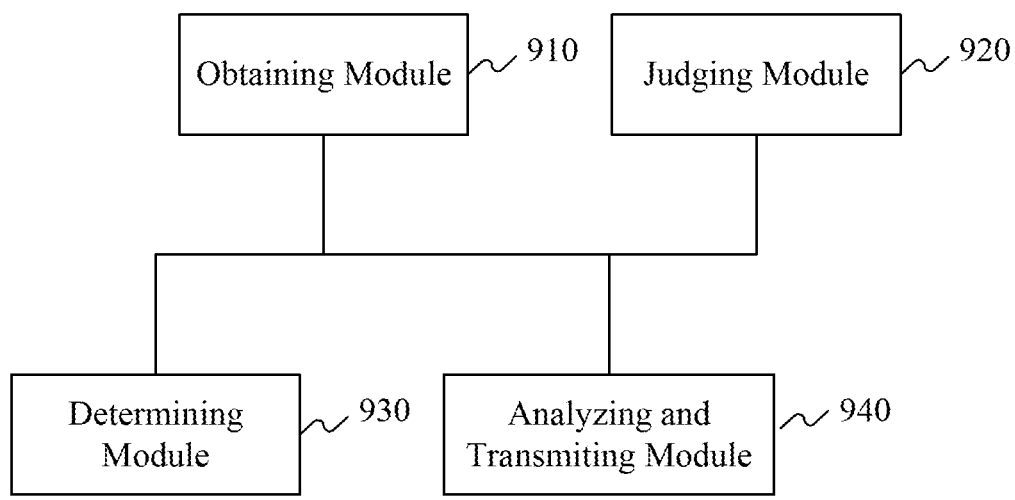
FIG. 9 is a block diagram of an apparatus for monitoring a status of a terminal compressor, according to an exemplary embodiment.

FIG. 9 is a block diagram of an apparatus 900 for monitoring a status of a terminal compressor, according to an exemplary embodiment. For example, the apparatus 900 may be part or whole of a first terminal or a server, by means of hardware, or software, or a combination of hardware and software. As shown in FIG. 9, the apparatus 900 includes an obtaining module 910, a judging module 920, a determining module 930, and an analyzing and transmitting module 940. The obtaining module 910 is configured to obtain a working status parameter of a compressor in the first terminal. The judging module 920 is configured to judge whether the working status parameter falls in a preset range. The determining module 930 is configured to determine that an abnormality of the compressor occurs, if the working status parameter does not fall in the preset range. The analyzing and transmitting module 940 is configured to analyze a reason for the abnormality and to transmit preset information to a second terminal that controls the first terminal.

Figure 10:
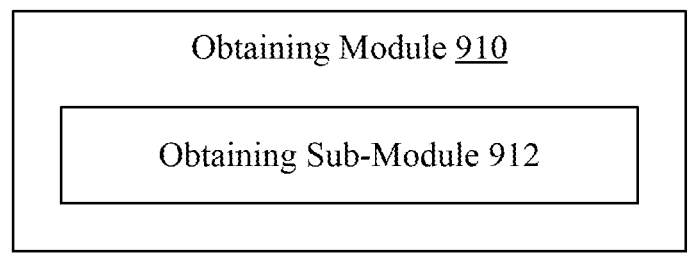
FIG. 10 is a block diagram of an obtaining module in an apparatus for monitoring a status of a terminal compressor, according to an exemplary embodiment.

FIG. 10 is a block diagram of an obtaining module 910 in an apparatus for monitoring a status of a terminal compressor, according to an exemplary embodiment. Referring to FIG. 10, the obtaining module 910 may include an obtaining sub-module 912 configured to receive the working status parameter via a pre-established communication connection between the apparatus 900 and the first terminal.

Figure 11:
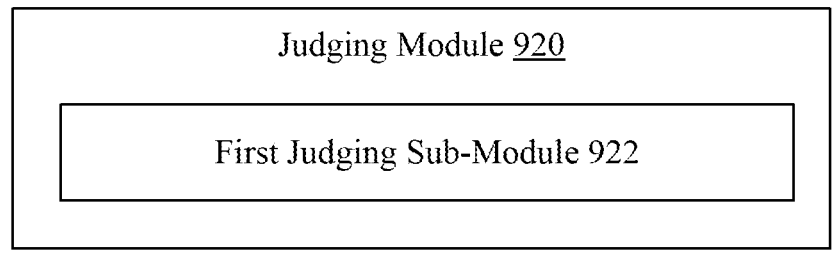
FIG. 11 is a block diagram of a judging module in an apparatus for monitoring a status of a terminal compressor, according to an exemplary embodiment.

In some exemplary embodiments, the working status parameter may include a working current of the compressor. FIG. 11 is a block diagram of a judging module 920 in an apparatus for monitoring a status of a terminal compressor, according to an exemplary embodiment. Referring to FIG. 11, the judging module 920 may include a first judging sub-module 922 configured to judge whether the working current exceeds a preset normal working current range of the compressor.

Figure 12:
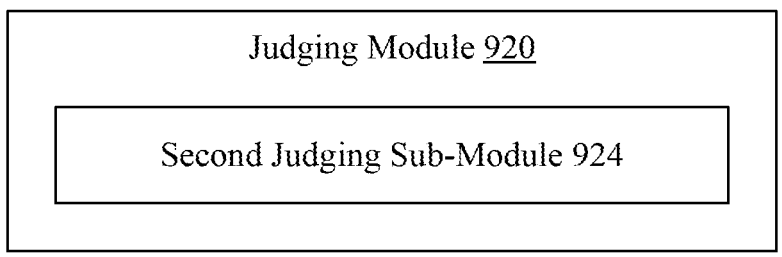
FIG. 12 is a block diagram of a judging module in an apparatus for monitoring a status of a terminal compressor, according to an exemplary embodiment.

FIG. 12 is a block diagram of a judging module 920 in an apparatus for monitoring a status of a terminal compressor, according to an exemplary embodiment. Referring to FIG. 12, the judging module 920 may include a second judging sub-module 924 configured to, when the first terminal is in a preset operation mode, judge whether the working current exceeds a preset working current range of the preset operation mode.

Figure 13:
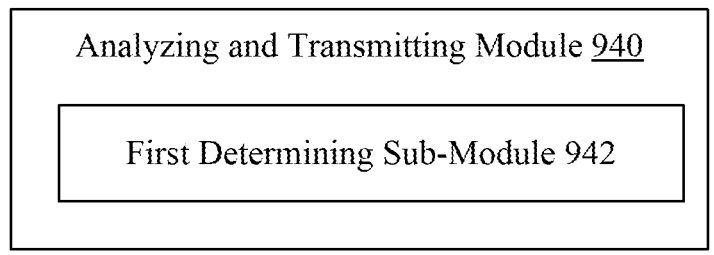
FIG. 13 is a block diagram of an analyzing and transmitting module in an apparatus for monitoring a status of a terminal compressor, according to an exemplary embodiment.

FIG. 13 is a block diagram of an analyzing and transmitting module 940 in an apparatus for monitoring a status of a terminal compressor, according to an exemplary embodiment. Referring to FIG. 13, the analyzing and transmitting module 940 may include a first determining sub-module 942 configured to obtain historical operation information of the compressor, and to determine the reason for the abnormality according to the historical operation information.

In one exemplary embodiment, the historical operation information may include the time for which the compressor has been used and a fault log of the compressor. Accordingly, the first determining sub-module 942 may be further configured to match the fault log and a real-time working current of the compressor with a pre-stored fault log to obtain a first matching result, and to determine, according to the first matching result, whether the compressor has a fault and the reason for the fault. Moreover, the first determining sub-module 942 may be further configured to, when the compressor has no fault, determine whether the compressor is aged according to the time for which the compressor has been used. Furthermore, the first determining sub-module 942 may be further configured to determine, when the compressor has no fault and is not aged, whether the compressor can execute user instructions for running a preset operation mode.

Figure 14:
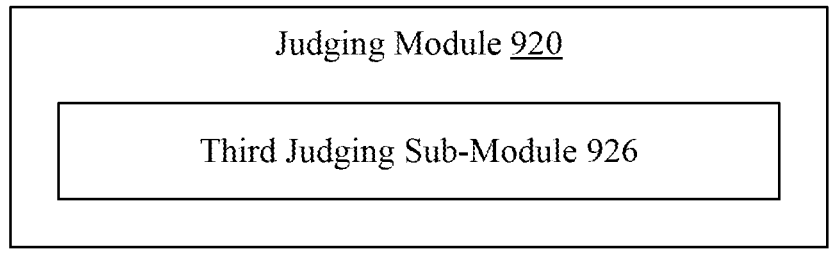
FIG. 14 is a block diagram of a judging module in an apparatus for monitoring a status of a terminal compressor, according to an exemplary embodiment.

In some exemplary embodiments, the working status parameter may include a vibrational displacement of the compressor. FIG. 14 is a block diagram of a judging module 920 in an apparatus for monitoring a status of a terminal compressor, according to an exemplary embodiment. Referring to FIG. 14, the judging module 920 may include a third judging sub-module 926 configured to judge whether the vibrational displacement exceeds a preset displacement threshold and lasts for a time longer than a preset time threshold.

FIG. 15 is a block diagram of an analyzing and transmitting module 940 in an apparatus for monitoring a status of a terminal compressor, according to an exemplary embodiment. Referring to FIG. 15, the analyzing and transmitting module 940 may include a second determining sub-module 944 configured to match a vibrational displacement curve corresponding to the vibrational displacement with a pre-stored vibrational displacement curve to obtain a second matching result, and to determine, according to the second matching result, whether the compressor has a fault and the reason for the fault.

Figure 16:
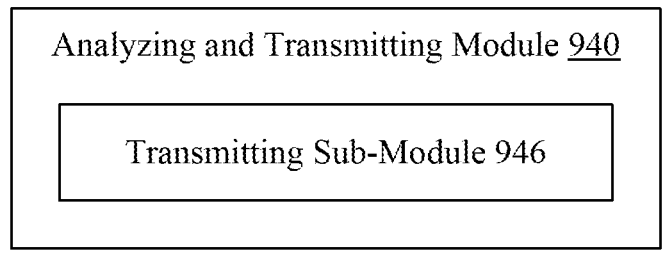
FIG. 16 is a block diagram of an analyzing and transmitting module in an apparatus for monitoring a status of a terminal compressor, according to an exemplary embodiment.

FIG. 16 is a block diagram of an analyzing and transmitting module 940 in an apparatus for monitoring a status of a terminal compressor, according to an exemplary embodiment. Referring to FIG. 16, the analyzing and transmitting module 940 may include a transmitting sub-module 946 configured to transmit prompt information regarding the occurrence of the abnormality to the second terminal, and to transmit prompt information regarding the reason for the abnormality to the second terminal when the reason for the abnormality is determined.

The above-describe apparatus 900 transmits the preset information to the second terminal when the apparatus 900 determines that an abnormality of the compressor occurs, such that the user can be timely informed of the occurrence of the abnormality and the reason for the abnormality through the second terminal. The user can then take further actions towards the abnormality of the compressor. Therefore, the apparatus 900 realizes the intellectualization of the first terminal and improves the user experience.

Figure 17:
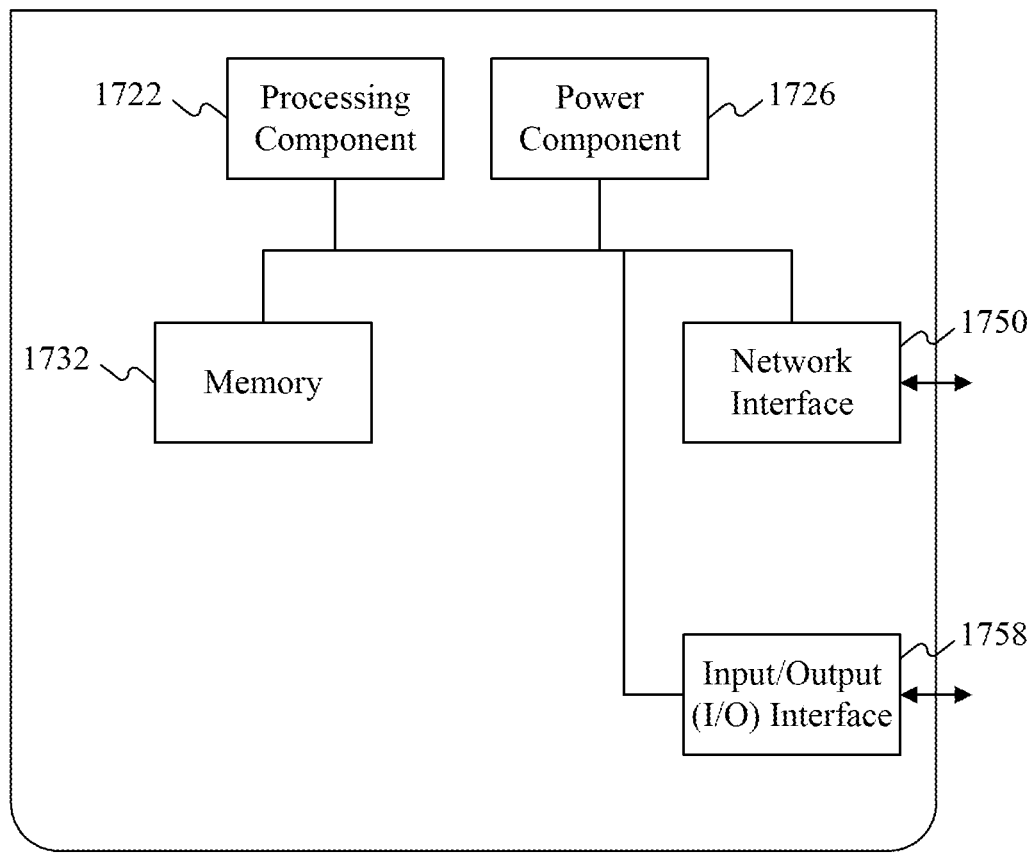
FIG. 17 is a block diagram of an apparatus for monitoring a status of a terminal compressor, according to an exemplary embodiment.

FIG. 17 is a block diagram of an apparatus 1700 for monitoring a status of a terminal compressor, according to an exemplary embodiment. For example, the apparatus 1700 may be a server. For another example, the apparatus 1700 may the terminal that includes the compressor. Referring to FIG. 17, the apparatus 1700 may include a processing component 1722, a power component 1726, a memory 1732, a network interface 1750, and an input/output (I/O) interface 1758.

The processing component 1722 may further include one or more processors. The memory 1732 includes memory resources storing instructions executable by the processing component 1722, such as application programs. An application program may include one or more modules, with each module further including a group of instructions. The processing component 1722 is configured to execute the instructions to implement the above-described methods. The power component 1726 is configured to execute power management of the apparatus 1700. The network interface 1750 is configured to connect the apparatus 1700 to the Internet in a wired or wireless manner. The apparatus 1700 may operate based on an operation system stored in the memory 1732, such as Windows Server™, Mac OS X™ Unix™, Linux™, FreeBSD™, or the like.

In exemplary embodiments, there is also provided a non-transitory computer-readable storage medium including instructions, such as included in the memory 1732, executable by the processing component 1722 in the apparatus 1700, for performing the above-described methods for monitoring the status of a terminal compressor.

Other embodiments of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for monitoring a status of a compressor of a first terminal, comprising:
   obtaining, by the first terminal, a working status parameter of the compressor;
   judging, by the first terminal, whether the working status parameter falls in a preset range;
   if the working status parameter does not fall in the preset range, determining, by the first terminal, that an abnormality of the compressor occurs; and
   analyzing, by the first terminal, a reason for the abnormality and transmitting, by the first terminal, preset information to a second terminal that controls the first terminal via a near field communication connection, wherein control right of the second terminal to the first terminal is verified before the near field communication connection is established between the first and second terminals.

2. The method according to claim 1, wherein, when the method is used in a device different from the first terminal, the obtaining of the working status parameter of the compressor in the first terminal comprises:
   receiving the working status parameter via a pre-established communication connection between the device and the first terminal.

3. The method according to claim 1, wherein, when the working status parameter comprises a working current of the compressor, the judging of whether the working status parameter falls in the preset range comprises:
   judging whether the working current exceeds a preset normal working current range of the compressor; or
   when the first terminal is in a preset operation mode, judging whether the working current exceeds a preset working current range of the preset operation mode.

4. The method according to claim 1, wherein the analyzing of the reason for the abnormality comprises:
   obtaining historical operation information of the compressor; and
   determining the reason for the abnormality, according to the historical operation information of the compressor.

5. The method according to claim 4, wherein
   the historical operation information comprises a time for which the compressor has been used and a fault log of the compressor;
   wherein the determining of the reason for the abnormality, according to the historical operation information of the compressor, comprises:
      matching the fault log and a real-time working current of the compressor with a pre-stored fault log to obtain a first matching result;
      determining whether the compressor has a fault according to the first matching result;
      when the compressor has the fault, determining the reason for the fault according to the first matching result;
      when the compressor has no fault, determining whether the compressor is aged according to the time for which the compressor has been used; and
      when the compressor is not aged, determining whether the compressor can execute user instructions for running a preset operation mode.

6. The method according to claim 1, wherein, when the working status parameter comprises a vibrational displacement of the compressor, the judging of whether the working status parameter falls in the preset range comprises:
   judging whether the vibrational displacement exceeds a preset displacement threshold and lasts for a time longer than a preset time threshold.

7. The method according to claim 6, wherein the analyzing of the reason for the abnormality comprises:
   obtaining a second matching result by matching a vibrational displacement curve corresponding to the vibrational displacement with a pre-stored vibrational displacement curve;
   determining whether the compressor has a fault according to the second matching result; and
   when the compressor has the fault, determining the reason for the fault according to the second matching result.

8. The method according to claim 1, wherein the transmitting of the preset information to the second terminal comprises:
   transmitting prompt information regarding the occurrence of the abnormality to the second terminal; and
   when the reason for the abnormality is analyzed, transmitting prompt information regarding the reason for the abnormality to the second terminal.

9. An apparatus for monitoring a status of a compressor of a first terminal, comprising:
   a processor; and
   a memory configured to store instructions executable by the processor;
   wherein the processor is configured to:
      obtain a working status parameter of the compressor;
      judge whether the working status parameter falls in a preset range;
      if the working status parameter does not fall in the preset range, determine that an abnormality of the compressor occurs; and
      analyze a reason for the abnormality and transmit preset information to a second terminal that controls the first terminal via a near field communication connection, wherein control right of the second terminal to the first terminal is verified before the near field communication connection is established between the first and second terminals.

10. The apparatus according to claim 9, wherein, when the apparatus is not the first terminal, the processor is further configured to:
    receive the working status parameter via a pre-established communication connection between the apparatus and the first terminal.

11. The apparatus according to claim 9, wherein, when the working status parameter comprises a working current of the compressor, the processor is further configured to:
    judge whether the working current exceeds a preset normal working current range of the compressor; or
    when the first terminal is in a preset operation mode, judge whether the working current exceeds a preset working current range of the preset operation mode.

12. The apparatus according to claim 9, wherein the processor is further configured to:
    obtain historical operation information of the compressor; and
    determine the reason for the abnormality, according to the historical operation information of the compressor.

13. The apparatus according to claim 12, wherein
the historical operation information comprises a time for which the compressor has been used and a fault log of the compressor;
wherein the processor is further configured to:
   match the fault log and a real-time working current of the compressor with a pre-stored fault log to obtain a first matching result;
   determine whether the compressor has a fault according to the first matching result;
   when the compressor has the fault, determine the reason for the fault according to the first matching result;
   when the compressor has no fault, determine whether the compressor is aged according to the time for which the compressor has been used; and
   when the compressor is not aged, determine whether the compressor can execute user instructions for running a preset operation mode.

14. The apparatus according to claim 9, wherein, when the working status parameter comprises a vibrational displacement of the compressor, the processor is further configured to:
   judge whether the vibrational displacement exceeds a preset displacement threshold and lasts for a time longer than a preset time threshold.

15. The apparatus according to claim 14, wherein the processor is further configured to:
   obtain a second matching result by matching a vibrational displacement curve corresponding to the vibrational displacement with a pre-stored vibrational displacement curve corresponding;
   determine whether the compressor has a fault according to the second matching result; and
   determine the reason for the fault according to the second matching result.

16. The apparatus according to claim 9, wherein the processor is further configured to:
   transmit prompt information regarding the occurrence of the abnormality to the second terminal; and
   when the reason for the abnormality is analyzed, transmit prompt information regarding the reason for the abnormality to the second terminal.

17. A non-transitory computer-readable storage medium storing instructions that, when executed by a processor of a device, causes the device to perform a method for monitoring a status of a compressor of a first terminal, the method comprising:
   obtaining a working status parameter of the compressor;
   judging whether the working status parameter falls in a preset range;
   if the working status parameter does not fall in the preset range, determining that an abnormality of the compressor occurs; and
   analyzing a reason for the abnormality and transmitting preset information to a second terminal that controls the first terminal via a near field communication connection, wherein control right of the second terminal to the first terminal is verified before the near field communication connection is established between the first and second terminals.

* * * * *